March 26, 1957 W. F. BENNETT ET AL 2,786,389
MICROSCOPIC INSPECTION APPARATUS
Filed April 8, 1954
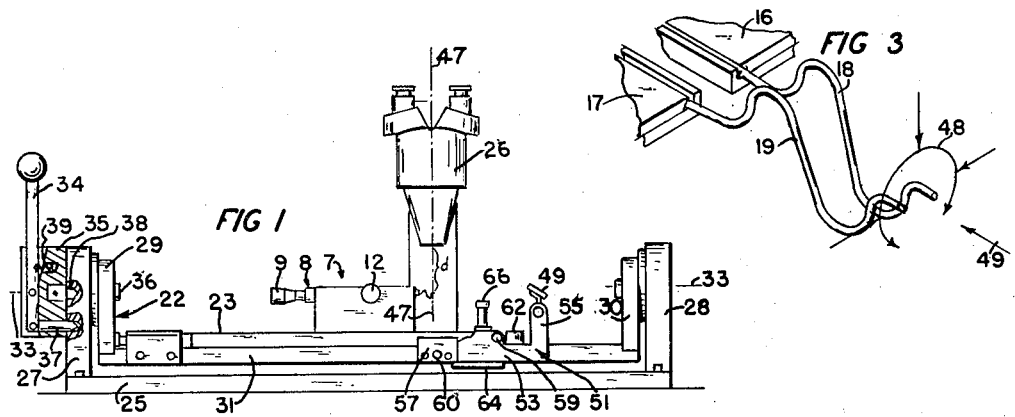
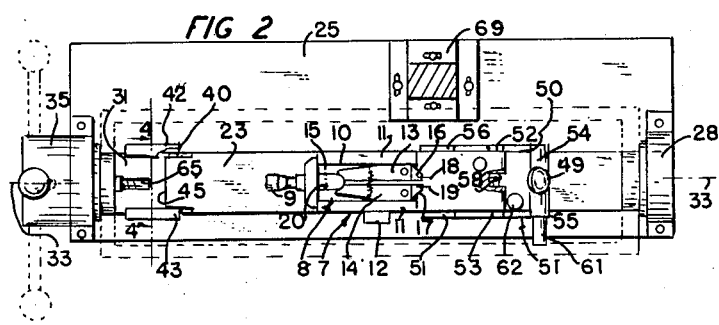
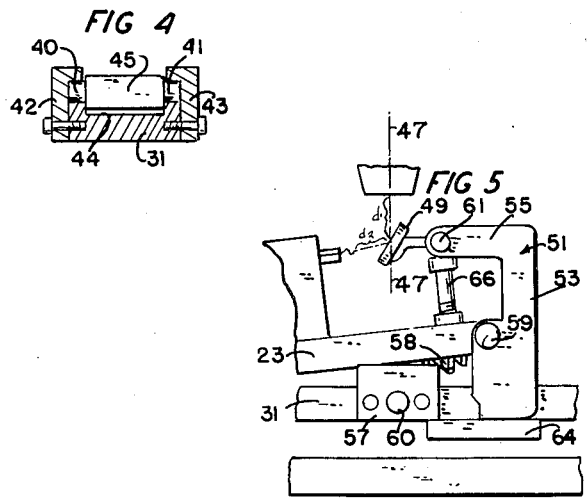
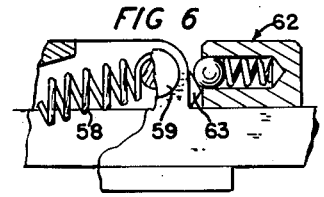
INVENTORS
W. F. BENNETT
W. R. YEICH
BY
*W. C. Parnell*
ATTORNEY

United States Patent Office 2,786,389
Patented Mar. 26, 1957

2,786,389
MICROSCOPIC INSPECTION APPARATUS

Wesley F. Bennett, Reading, and William R. Yeich, Westlawn, Pa., assignors to Western Electric Company, Incorporated, New York, N. Y., a corporation of New York Application April 8, 1954, Serial No. 421,874

7 Claims. (Cl. 88—40)

This invention relates to apparatus for making microscopic visual inspection of articles and particularly to a device for moving articles through various positions within the field of a focused microscope.

In the manfacture of point contact type transistors and other semi-conductor devices, the semi-conductor contacting portions of the electrode wires must undergo a thorough microscopic inspection in order to insure proper functioning of the completed device. In carrying on such inspections in the past, it was necessary to refocus the microscope for the various viewing positions of the contact wires thereby making adjustments of the relative spacing of the wires difficult since one hand was required for refocusing the microscope.

It is, therefore, the principal object of the invention to provide apparatus which will permit an operator to inspect an article from any desired number of positions with only a single focusing adjustment of the microscope.

In accordance with the general features of the invention, articles to be inspected are rotatably mounted on a base member for the microscope such that the parts of the articles to be inspected lie substantially along the axis of rotation thereof, the microscope being focused on said parts so they may be viewed from any rotated position. For viewing the parts from a direction other than that obtained by rotation of the articles a mirror is aligned with the optical axis and the parts are shifted to a position where the reflected image may be seen in the microscope over an optical path of the same length as for direct viewing so that no refocusing adjustment is required.

These and other features of this invention will be more fully understood from the following detailed description taken in conjunction with the accompanying drawing, in which:

Figs. 1 and 2 are side elevational and plan views respectively, partially in section, of a device according to the invention;

Fig. 3 is a perspective view of point contact members mounted in the device of Fig. 1 showing the various views thereof obtainable with the device;

Fig. 4 is a cross-sectional view of the cradle along the plane of line 4—4 of Fig. 2;

Fig. 5 is a side elevational view of the holder positioning mechanism of the device; and Fig. 6 is an enlarged view partially in section of a portion of Fig. 1.

Referring now to the drawing, the apparatus shown for illustrating the invention comprises basically a main supporting base 25 for microscope 26 having extension members 27 and 28 to which a cradle 22 is rotatably mounted. The cradle 22 supports a movable work holding device 7 the specific type of which would vary with the article to be inspected. The microscope 26 is adjustably mounted to base 25 by the double slotted plate arrangement 69 which is shown in Fig. 2.

The work holder 7 is shown with an adjustable transistor contact wire holder 8 secured in the ways 11 thereof by means of a locking screw 12. This wire holder comprises a pair of spring biased arms 13 and 14 pivotally mounted near one end of a base plate 15. Jaws 16 and 17 at the ends of arms 13 and 14 are provided for holding S bent contact wires 18 and 19 respectively. A wedge member 20 controlled by micrometer movement 9 is used to move the arms on their pivots to adjust the spacing between the wires 18 and 19. A wire holder of this type is described in co-pending application No. 346,556, filed by Karl A. Schmuldt on April 3, 1953, now Patent No. 2,688,267.

The cradle 22 having end members 29 and 30 interconnected by cross plate 31 is rotated about axis 33—33 under control of lever 34. The housing 35 for lever 34 is pinned directly to shaft 36 which shaft is also pinned to the cradle. The cradle may be moved to, and locked in, a number of rotated positions by the insertion of locking pin 37, connected to the end of lever 34, in holes 38 located along an arc in member 27 corresponding to the rotary path of pin 37; a compressed spring 39 normally urges lever 34 toward the locking position.

Member 23 to which the work holder 7 is mounted, is movable on the cradle cross plate 31, one end thereof having extending therefrom pins 40 and 41 (Fig. 4) which are slidable on the plate 31 within grooves provided by side plates 42 and 43 respectively on plate 31. A recess 44 in plate 31 allows clearance for end 45 of member 23 when the other end thereof is raised as will be described below.

In the direct viewing position of the apparatus as seen in Figs. 1 and 2, the work holder 7 is supported on member 23 so that the parts of the contact wires extending from the wire holder 8 that are to be inspected (the end portions) lie substantially along the rotational axis 33—33 for the cradle at the intersection thereof by optical axis 47—47 of the microscope. The microscope is focused on this intersection point and the cradle may be rotated by lever 34 so that the ends of the wires may be observed from any rotated position represented by arc 48 in Fig. 3.

Viewing the ends of the wires in the direction shown by arrow 49 (Fig. 3) is accomplished by raising the work holder 7 as seen in Fig. 1 up toward and to the left of the microscope and by moving a mirror 49 into the microscope's optical axis. The mirror is aligned to permit viewing the ends of the wires with the microscope through the reflection in the mirror. The distance "$d_2$" from the ends of the wires to the mirror plus the distance "$d_1$" from the mirror to the end of the microscope as seen in Fig. 5, is made equal to the distance "$d$" from the rotational axis 33—33 to the end of the microscope (Fig. 1) so that the image of the ends in the mirror can be observed without refocusing of the microscope.

The mechanical linkage for making the above "end" observation is shown in the enlarged view of Fig. 5. L-shaped camming brackets 50 and 51 are pivotally mounted by bolt 59 at corresponding intermediate positions on bracket legs 52 and 53 respectively to the end of member 23. The mirror 49 is mounted between the ends of the other bracket legs 54 and 55. In its normal "down" position (Figs. 1 and 2) the ends of legs 52 and 53 butt against plates 56 and 57 respectively which positions the member 23 on plate 31, a stretched spring 58 mounted between pivot bolt 59 and bolt 60 on the plate 31 holds the brackets against the plates 56 and 57. Recesses are provided in member 23 and in plate 31 for the spring. Arms 52 and 53 of brackets 50 and 51 straddle the plate 31 and a cross member 64 of the bottom of the plate 31, extending beyond the sides thereof, provides a support for the ends of bracket arms 52 and 53 when the brackets are rotated to the "raised"

position by lever 61. The plates 56 and 57 and the member 64 provide camming surfaces for the ends of bracket arms 52 and 53 which act as a cam in raising or lowering member 23.

In addition to the tension in spring 58 tending to hold the member 23 in contact with plate 31 in the "down" position, a spring loaded ball bearing lock 62 (Fig. 6) applies sufficient pressure on camming surface 63 of the member 23 to insure its retension in this position.

By first overcoming the force of the ball bearing lock 62 on cam 63, the brackets may be rotated to the "raised" position. In this operation the member 23 is also moved to the left, the pins 40 and 41 at the left end thereof sliding along the grooves provided therefor while the ends of bracket arms 52 and 53 make camming engagement against the plates 56 and 57 respectively and cross member 64. The movement of the member 23 along plate 31 is limited by the adjustable stop screw 65 on the cradle end member 29. In the fully rotated position, the tension of spring 58 holds member 23 against the stop 65 and also holds the brackets on cross member 64. An adjustable stop 66 permits minor adjustments of the rotation of the brackets to control the final setting of the mirror.

To adapt the above described apparatus for inspection of batches of different articles and to provide for initial set-up adjustments, the positioning of member 23 is made adjustable by stop 65, overtravel of the rotatable brackets 50 and 51 being prevented by stop 66. In addition, the mirror 49 may be rotatably mounted between the ends of bracket legs 54 and 55 and be provided with an adjustable support shaft extending thereto.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for positioning articles for optical inspection from a fixed position by viewing in a fixed direction, said apparatus comprising a base, an article support on the base for positioning an article thereon within the viewing path from the fixed position, means for moving the support to shift the article thereon out of said viewing path and a mirror mounted on the moving means for movement into said viewing path when the support is shifted for reflecting light from the shifted article to the fixed viewing position for observing the article in the shifted position.

2. Apparatus for positioning articles for optical inspection from a fixed position by viewing in a fixed direction, said apparatus comprising a base, an article support on the base for positioning an article thereon within the viewing path from the fixed position, means for moving the support to shift the article thereon out of said viewing path and a mirror mounted on the moving means for movement into said viewing path when the support is shifted for reflecting light from the shifted article to the fixed viewing position for observing the article in the shifted position, the moving means and mirror mounting being so proportioned that the light paths from the article to the fixed viewing position are equal for both positions.

3. For positioning articles for optical inspection, apparatus comprising a base, a cradle mounted on the base for planetary rotation about an axis, an article support on the cradle, means for selectively moving the support to either of two positions for viewing an article from an observation point having a fixed viewing direction, the article in the first position being substantially on said axis in the viewing path from the observation point, and in the second position being shifted out of the viewing path and a mirror mounted on the support moving means for movement into the viewing path from the observation point for observing the articles in the shifted position.

4. For positioning articles for optical inspection, apparatus comprising a base, a cradle mounted on the base for planetary rotation about an axis, an article support on the cradle, means for selectively moving the support to either of two positions for viewing an article from an observation point having a fixed viewing direction, the article in the first position being substantially on said axis in the viewing path from the observation point, and in the second position being shifted out of the viewing path and a mirror mounted on the support moving means for movement into the viewing path from the observation point for observing the articles in the shifted position, the moving means and mirror mounting being so proportioned that the light path from the article to the observation point are equal for both positions.

5. For positioning articles for optical inspection, apparatus comprising a base, a cradle mounted on the base for planetary rotation about an axis, a member movably supported on the cradle, means for supporting an article on the member, camming means for selectively moving the member to either of two positions for viewing an article from an observation point having a fixed viewing direction, the article in the first position being substantially on said axis in the viewing path from the observation point, and in the second position being shifted out of the viewing path, a first and second stop on the cradle, resilient means for holding the camming means against the first stop for the first position and the member against the second stop for the second position and a mirror, mounted on the camming means for movement into the viewing path from the observation point, for observing the articles in the second position.

6. For positioning articles for optical inspection, apparatus comprising a base, a cradle mounted on the base for planetary rotation about an axis, a member movably supported on the cradle, means for supporting an article on the member, a guide on the cradle for one end of the member, camming means pivotally connected to the other end of the member for selectively moving the member to either of two positions for observation of an article on the support from a fixed point by viewing in a single direction therefrom, the article in the first position being substantially on said axis in the direct viewing path from the observation point and in the second position shifting the article closer to the observation point and out of said direct viewing path, a mirror mounted on the camming means for movement into the direct viewing path when the article is moved to the second position for observing the article by the reflected image thereof, stops on the cradle for each of the positions of the member thereon and resilient means for holding the camming means against one of the stops in the first position and for holding the member against the other stop for the second position, the camming means being proportioned and the stops located so that the lengths of the viewing paths for both positions are the same.

7. For positioning articles for optical inspection, apparatus comprising a base, a cradle mounted on the base for planetary rotation about an axis, means for selectively locking the cradle in any rotated position, a member movably supported on the cradle, means for supporting an article on the member, ways on the cradle for one end of the member, a spring biased cam pivotally connected to the other end of the member for moving the member to either of two positions for observation of an article thereon from a fixed point by viewing in a single direction therefrom, the article in the first position being substantially on said axis in the viewing path from the observation point and in the second position shifting the article closer to the observation point and out of said viewing path, a mirror mounted on the cam for movement into the viewing path when the article is moved to the second position for viewing the article by the reflected image thereof and stops on the cradle for each position of the member thereon, the cam being proportioned and the stops located so that the lengths of the viewing paths for both positions are the same.

References Cited in the file of this patent

UNITED STATES PATENTS

| | | |
|---|---|---|
| 1,703,933 | Hartness et al. | Mar. 5, 1929 |
| 1,789,009 | Luce | Jan. 13, 1931 |
| 1,868,908 | Lindley | July 26, 1932 |
| 1,896,828 | Nichterlein | Feb. 7, 1933 |
| 2,021,232 | Fassin | Nov. 19, 1935 |
| 2,192,529 | Thomas et al. | Mar. 5, 1949 |
| 2,373,930 | Turrettini | Apr. 17, 1945 |
| 2,398,139 | Freeman | Apr. 9, 1946 |